Sept. 12, 1961  G. MUSAPHIA  2,999,326
APPARATUS FOR PRODUCING ANIMATED OPTICAL EFFECTS
Filed Oct. 14, 1958  4 Sheets-Sheet 1

Inventor
GEORGES MUSAPHIA
By
Attorney

Inventor
GEORGES MUSAPHIA
By
Attorney

Sept. 12, 1961   G. MUSAPHIA   2,999,326
APPARATUS FOR PRODUCING ANIMATED OPTICAL EFFECTS
Filed Oct. 14, 1958   4 Sheets-Sheet 3
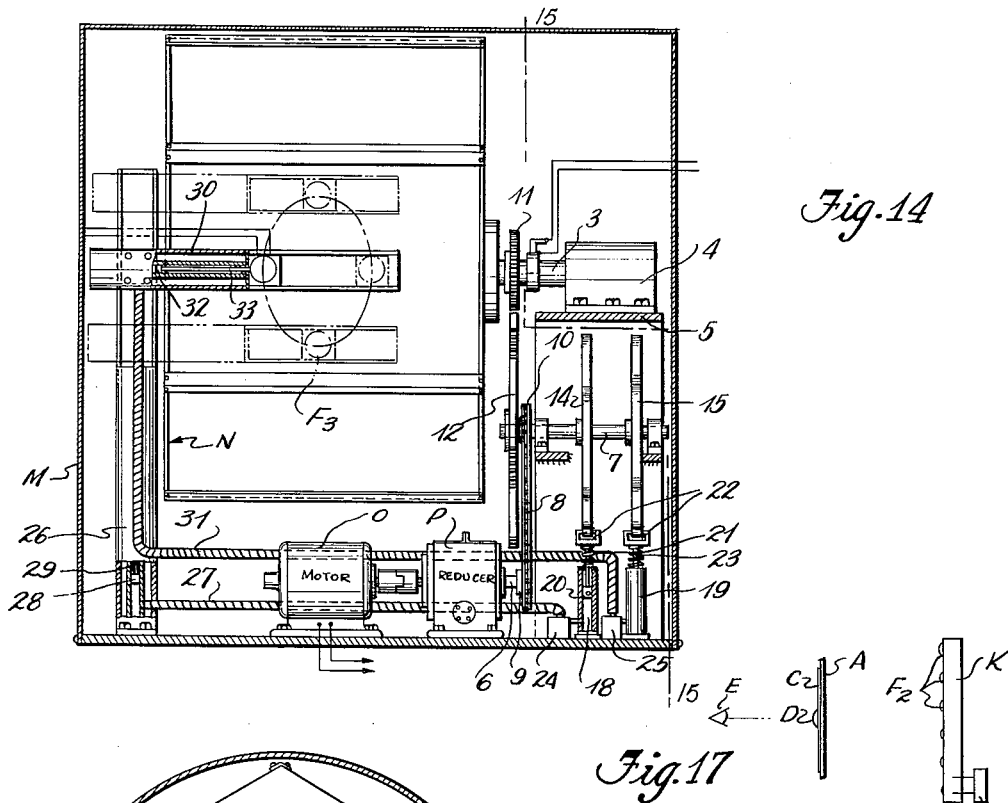
Fig. 14
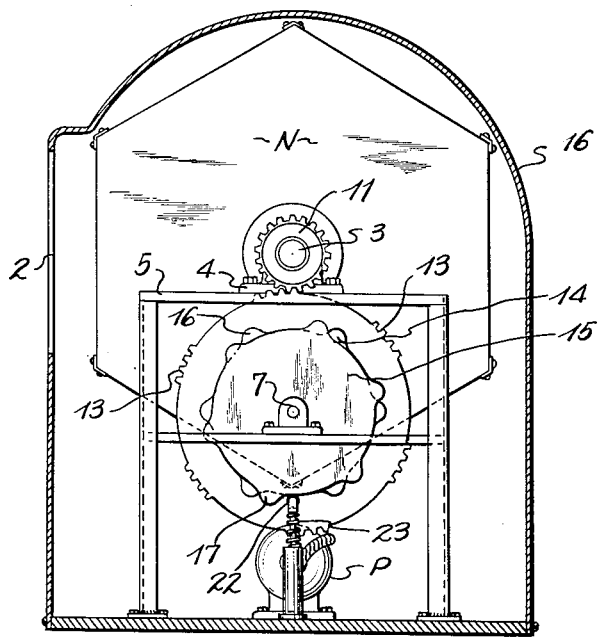
Fig. 15
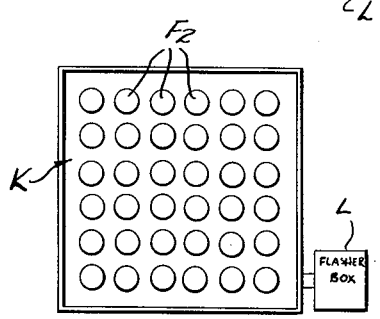
Fig. 17
Fig. 16
Inventor
GEORGES MUSAPHIA
By
Attorney Sept. 12, 1961  G. MUSAPHIA  2,999,326
APPARATUS FOR PRODUCING ANIMATED OPTICAL EFFECTS
Filed Oct. 14, 1958  4 Sheets-Sheet 4
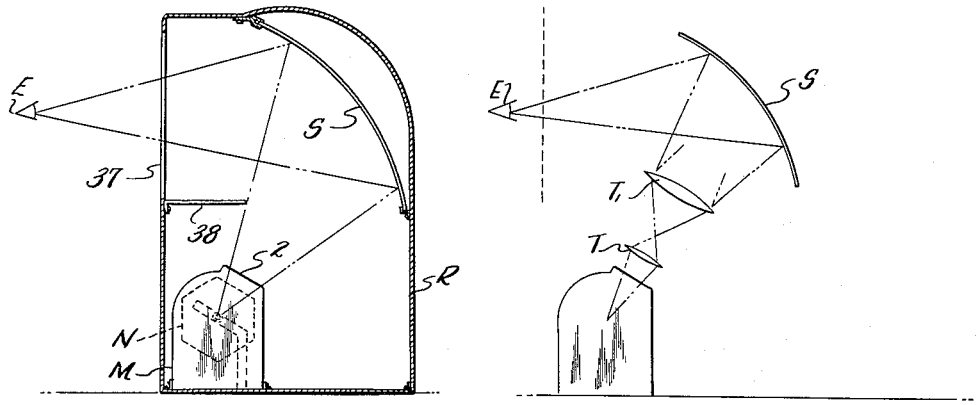
Fig. 18  Fig. 19
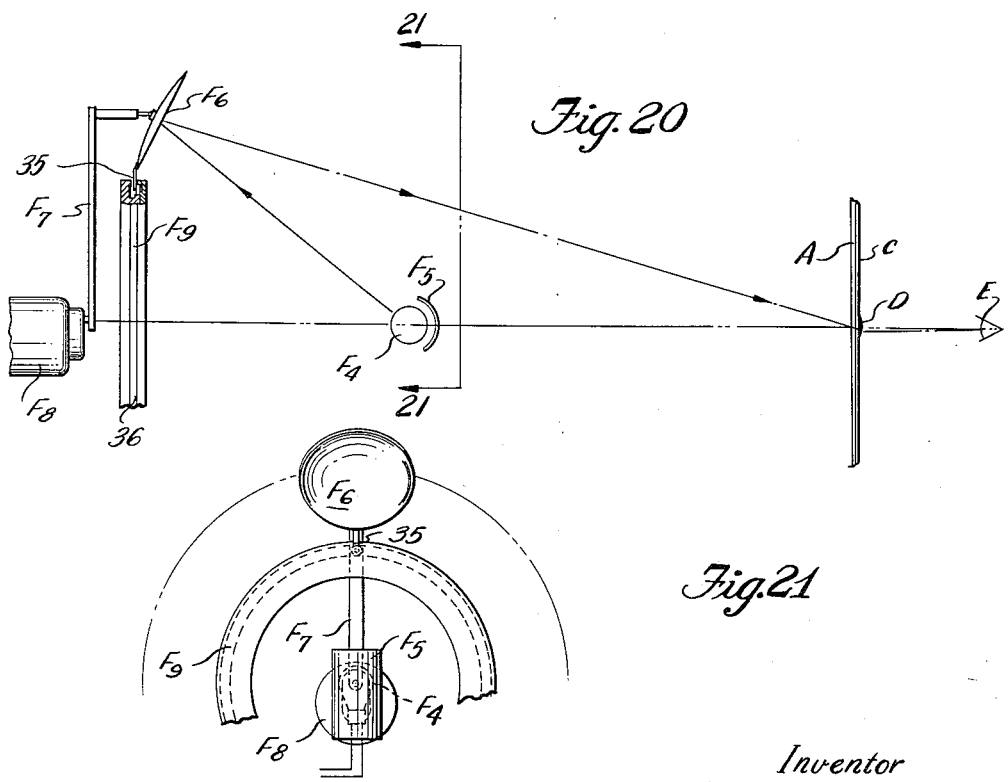
Fig. 20
Fig. 21
Inventor
GEORGES MUSAPHIA
By
Attorney

United States Patent Office 2,999,326
Patented Sept. 12, 1961

2,999,326
APPARATUS FOR PRODUCING ANIMATED OPTICAL EFFECTS
Georges Musaphia, 87 Withington Road, Newton, Mass.
Filed Oct. 14, 1958, Ser. No. 769,052
4 Claims. (Cl. 40—106.52)

This invention relates to method and means for producing animated optical effects whereby an image of a person or object carried on a light transmitting plate or film when overlaid with a light transmitting screen formed with bulbous distortions from the plane of the screen and positioned in front of the image relative to a movable source of light or a bank of lights adapted to be selectively energized for varying the angle of incidence of the projected light upon the image or portions thereof, may produce effects simulating the movement of parts of the image due to the variability of the light rays from a source.

For instance, a still photograph of persons or animals may be represented by an image upon a glass plate or film in the usual manner and on the obverse side of the plate or film I may affix or mount adjacently a translucent screen preformed with bulbous portions of convex form and of desired outlines and extent overlying certain portions or features of the photographic image or cartoon so that when a light is moved circularly or otherwise behind the image carrier, or individual lights of a bank are energized in a predetermined order of succession the projected rays will be directed at different angles of incidence through the bulbous portions of the screen in order that a viewer of the image will observe simulated movement of portions of the image underlying the bulbous portions of the screen.

Thus novel optical effects may be produced either from projection of light upon a photograph, cartoon or other type of fanciful or fantastic drawing, which, to an observer, will simulate motion. For example, if a bulb on the screen is positioned over an eye of the image, when the light is moved relative to the image, or vice versa, the eye of the image will appear to move in a direction opposite or to that in which the light is moved. The same would be true of an ear, a finger, arm or any other portion of the image.

I have obtained letters patent of the United States on certain methods and apparatus for producing animated picture effects, as disclosed in my patents numbered 2,196,423, 2,196,424, 2,204,435 and 2,279,241, which relate particularly to methods and means for projecting light through a translucent screen on which are mounted light transmitting images having certain portions affixed to a surface of the screen while other portions of the images are bent outwardly from the screen so that when the light and images are relatively moved silhouettes of portions of the images, but not shadows, are displayed on the screen in different positions so that when viewed an illusion of motion is produced.

I seek to provide in this instance an improved method and means for producing animated optical effects which will accomplish the aforesaid results singly or in combination so that an apparatus embodying necessary elements may be readily adaptable for educational, advertising and other purposes.

A further object is to provide an apparatus of the character hereinbefore mentioned which, for certain purposes, may include a reflecting mirror onto which the animated pictures may be projected and from which they are reflected so as to be viewed by observers collectively or individually, and which is capable of arrangement, as in a store window or other location—so that the pictures may be viewed by a number of people, or in a cabinet arranged for displaying the pictures, one at a time to individuals.

Other and more detailed objects may appear as the description of my invention progresses.

I have shown in the accompanying drawings several forms of apparatus embodying the features and principle of my invention, subject, however, to further modification, within the scope of the appended claims, without departing from the spirit thereof. In said drawing:

Figure 12:
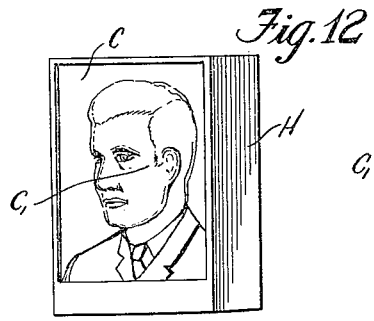
Figure 13:
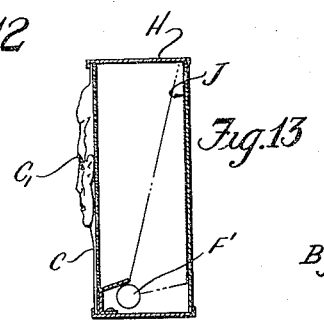

FIGS. 12 and 13 are views of a condensed apparatus having a light transmitting surface molded and in relief on the front of a transparent static image, a suitable cabinet and a housed light adapted to be projected onto a reflecting surface on the back of said cabinet so as to reflect the light rays forwardly through the image, and a molded screen for producing actual stereoscopic reproduction of an otherwise flat picture;

FIG. 14 is a sectional elevation of a machine for effecting and controlling the movement of a source of light and means for successively presenting to viewers a series of pictures;

FIG. 15 is a sectional elevation of the machine on line 15—15 of FIG. 14.

Figure 1:
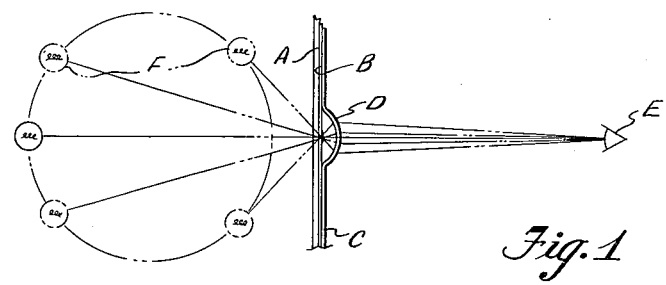
FIG. 1 shows a diagram of the simplest form and arrangement of parts for attaining the objects of invention, by means of which the animated optical effects may be viewed by the eyes of an observer.

FIG. 16 is a face view, in elevation, of a bank of flasher controlled lights adapted for use in lieu of a single movable light source;

FIG. 17 is a diagram similar to FIG. 1 showing a bank of stationary lights instead of a single movable light;

FIG. 18 is a view of a picture viewing unit embodying the structure of FIGS. 14 and 15 and a parabolic mirror for receiving and reflecting images collective viewing thereof;

FIG. 19 is a diagram of the apparatus of FIG. 18 including enlarging lenses interposed between the image and the reflector;

FIG. 20 is a diagram of an apparatus embodying a single stationary light and a reflector movable relative to the light; and FIG. 21 is a fragmentary view in the plane of line 21—21 of FIG. 20.

Figure 2:
FIGS. 2, 3 and 4 show a static image produced by still photography on a light transmitting plate or film in which the eyes of the image appear in successive and different positions.
Figure 3:
Figure 4:

In one form of apparatus as shown in FIG. 1, I provide an image carrier A in the form of a light transmitting plate or film on the obverse side of which is held an image B, over which I apply adhesively or in any event in an adjacent plane a translucent screen C. Said screen is provided at desired points with bulbous protrusions or distortions D of any desired form, contour and size so that when viewed as in FIG. 1 by the eye light from a movable source F will be deflected by the bulbous portions D and afford a simulation of movement of the bulb covered parts of the image. For instance, in FIGS. 2, 3 and 4 it will be noted that the eyes of image B appear to be in different positions as viewed by eye E, according to different positions of light F relative to image B. Hence, with a bulb D over one eye of the image the movement of lamp F may be caused to simulate a wink or roll of that one eye, and when a bulb covers both eyes both will appear to roll laterally or otherwise as the lamp is moved.

Similarly one or both ears, the lips, fingers or other portions of the image may appear to move by a desired placement of one or more bulbs D arranged in front of the image.

Figure 5:
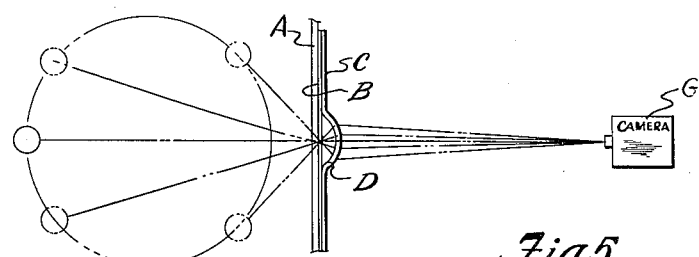
FIG. 5 is a diagram similar to that shown in FIG. 1 except that a camera is substituted for human eyes.
Figure 6:
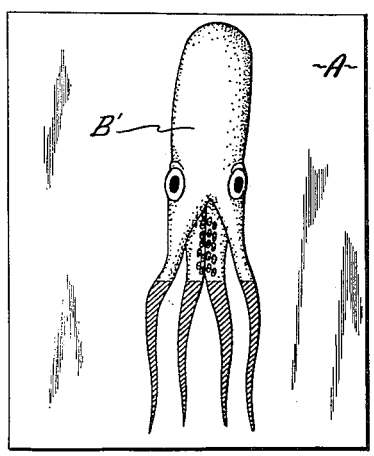
FIGS. 6, 7, 8, 9 and 10 show different views of an octopus, the image of which is of light transmitting character and portions of which (as for instance, the tentacles) are loose on and bent at angles from the plate or image carrier.
Figure 7:
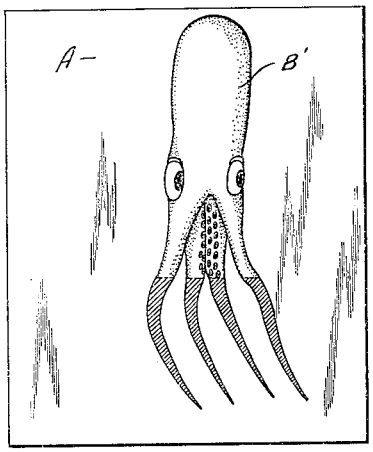
Figure 8:
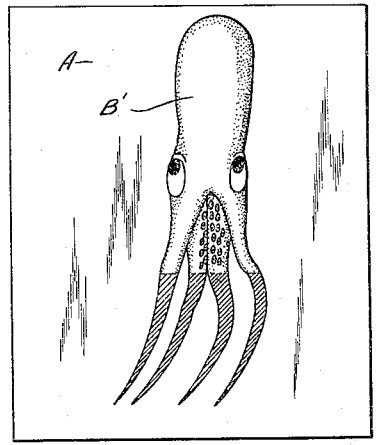
Figure 9:
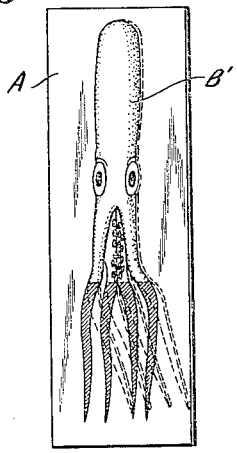
Figure 10:
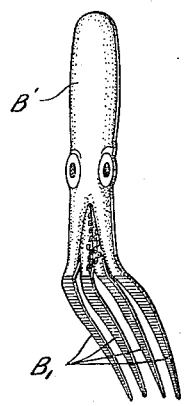

Still or motion picture effects may be produced by the positioning of a camera G in focus with the image as shown in FIG. 5.

In FIGS. 6 to 11 inclusive I have shown an image B' representative of, for instance, an octopus which instead of being photographed on the carrier A is formed of a separate piece of light transmitting material and has the head and body adhesively applied to the carrier A while its tentacles $B_1$ are loose and bent outwardly from the plane of the carrier so that when light F is moved the tentacles will be silhouetted on the screen C and the tentacles will appear to move. In this case a bulb or bulbs D may be formed on screen C in front of and over the eyes of the octopus for simulating movement of the eyes as the light F is moved.

In some cases the screen C may be formed with a translucent mask $C_1$ with the features or characteristics of a subject image in relief, as shown in FIGS. 12 and 13, a cabinet H and a stationary or movable light F' suitably mounted in said cabinet for directing rays of light upon a reflecting element J on the back of the cabinet and thence by reflection through the translucent mask $C_1$. When light F' is stationary the variably bulbed mask $C_1$ will deflect light rays from the reflector J and afford depth and tone to the image. When light F' is movably disposed relative to the image the features, such as the eyes, ears, nose and lips will appear to move under the observation of a viewer to an extent and corresponding to the range and path of movement of the light.

Figure 11:
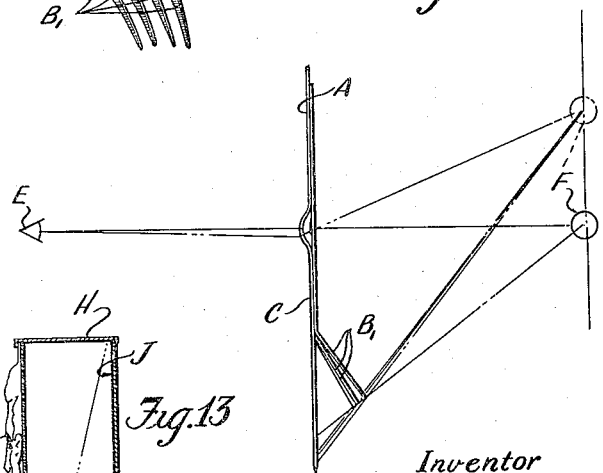
FIG. 11 is a diagram showing the image of the octopus applied to the image carrier.

In FIGS. 1, 5 and 11 I have shown the light F arranged for movement in a desired path or orbit relative to the image, but I do not limit myself to such an arrangement, for as shown in FIGS. 16 and 17, substantially equivalent results may be obtained by the provision of a plurality of lights $F_2$ arranged in a group on a panel K and adapted to be selectively energized as by means of any well known type of motor driven flasher L not material to this invention. It is obvious that as preselected lights $F_2$ are energized the successive rays therefrom will be directed at varying angles of incidence upon the bulbous portions D of the screen C and will occasion a simulation of movement of the bulb covered features of the image.

I do not depend upon any particular means for moving the light F relative to the image or vice versa but reference is made to patents of the United States, granted to me and numbered 2,196,423, 2,196,424, 2,204,435 and 2,279,241 in which several different types of mechanism are shown which in certain cases might serve the purpose of either moving the light or the image.

As shown in FIGS. 14 and 15 my improvements may be embodied in a self-contained unit including a cabinet M in which a drum or multiple image carrier N is mounted for intermittent rotation for successively displaying a series of images B through a viewing aperture 2 (FIG. 15), together with a suitable actuating means for the drum and a light or lights F.

The particular type of actuating means shown is a combination of mechanical and hydraulic elements so interconnected and arranged that when operated by an electric motor the image carrying drum will rotate to an extent of a predetermined fraction of a revolution for presenting successive images in and holding the same in viewing position for a required period of time adjacent aperture 2.

Drum N is fixed to a shaft 3 which is journalled in one or more bearings 4 mounted as on a base 5 affixed to cabinet M and is adapted to be driven by a motor O through a speed reducing unit P and a train of gears which I will now describe. Shaft 6 of unit P operates a counter shaft 7 by means of a chain 8 running over sprockets 9 and 10 on shafts 6 and 7, respectively. Shaft 3 carries a pinion 11 adapted to mesh with an intermittent gear 12 fixed to shaft 7 and provided with spaced sets of teeth 13 correspond in number to the number and positions of the images B on drum N, tears 11 and 12 may be of interlocking type or otherwise or other intermittently operative connections may be provided between shafts 3 and 7.

Shaft 7 carries a pair of cams 14 and 15 having similar or differently formed dwells 16 and 17, respectively, thereon (one for each image B on drum N). Cam 14 is operative for vertically moving a lamp $F_3$ and cam 15 for horizontally moving said lamp within the drum N by regulating and effecting a flow of fluid as hereinafter described through requisite pipes and connections, so that lamp $F_3$ may traverse a desired orbit within the drum as indicated in FIG. 14. Cams 14 and 15 are associated, respectively with hydraulic cylinders 18 and 19, each of which has a piston 20 slidable therein and a stem 21 on the upper end of which is a follower 22. Each piston stem has a spring 23 which is compressed between the top of its associated cylinder and its follower 22 so as to urge the follower into constant engagement with the periphery of its associated cam. Each cylinder (18 and 19) has a separate reservoir 24—25 in communication therewith below the associated piston 20 so that pressure created in a cylinder will be communicated to the associated reservoir for exhausting fluid therefrom as the piston descends under the influence of its cam 14 or 15 for occasioning the vertical or horizontal movement of light $F_3$ to an extent and in directions predetermined by cams 14 and 15.

Reservoir 24 is connected with cylinder 18 and reservoir 25 is connected with cylinder 19 as shown. Reservoir 24 is also connected with a cylinder 26 by means of a flexible hose or tube 27 in which a piston 28 is slidable and has a stem 29 fixedly secured to and forming a support for a horizontally disposed cylinder 30 on which light $F_3$ is supported. Thus, as piston 20 descends in cylinder 18 pressure is applied to and through reservoir 24 and tube 27 to cylinder 26 at a point below piston 28, thereby causing cylinder 30 and lamp to be vertically moved in the drum N correspondingly. Similarly, reservoir 25 is connected at 31 with cylinder 30 at a point (as shown) to the left of a piston 32 which is slidable in cylinder 30 and has a stem 33 to which light $F_3$ is directly secured.

The operation of cam 15, therefore effects horizontal movement of light $F_3$ either independently or coincidentally with its vertical movement as is determined by the peripheral form of cams 14 and 15. As each of the portions 16 and 17 of said cams forces the pistons downwardly the springs 23 are compressed and following the descent of pistons 20 the tension of said springs serves to elevate said pistons to positions preparatory to succeeding operations.

The cylinders 18, 19, 26 and 30, reservoirs 24 and 25, and the connections 27 and 31 are always completely filled with a suitable liquid and the operation of pistons 20, 20, 28 and 32 merely serve to displace the contained liquid for occasioning the movement of light $F_3$ under the influence of cams 14 and 15. The units 26—28 and 30—32 are in effect hydraulic rams and may be of such relative dimensions as to insure a desired movement of light $F_3$. The upper portion of cylinder 26 and the right hand portion of cylinder 30 may be split or otherwise formed to provide a guide for cylinder 30 in its vertical movement and a guide for light $F_3$ in its horizontal movement, respectively.

It is apparent that the orbit of light $F_3$ will correspond to the relative vertical and horizontal movement thereof as occasioned by the operation of pistons 20 in cylinders 18 and 19 and the particular configuration of cams 14 and 15. If necessary, suitable check valves may be inserted in cylinders 18 and 19, reservoirs 24 and 25, connections 27 and 31 and cylinders 26 and 30, or in pistons 20, 28 and 32 to control the flow of fluid during the operation of the apparatus. Such valves are of well known commercial character and are not material to my invention inasmuch as any suitable mechanical means may be employed for actuating the light source, as for instance the means disclosed in my hereinbefore mentioned patents.

I emphasize the fact that in order to create the optical effects I have herein set forth, it is immaterial whether the light is moved relative to the image, or vice versa, so long as there is relative movement therebetween. So, to illustrate and disclose a movement of an image relative to a stationary light, I have shown in FIGS. 20 and 21 a fixed light $F_4$ with a reflector $F_5$ therebehind, a second reflector $F_6$ tiltably supported on a rotatable carrier $F_7$ and driven by a motor $F_8$ and a fixed annular guide $F_9$ around which the reflector $F_6$ revolves for directing rays of light from the source $F_4$ upon an image so as to be viewed by eye E. In this form of apparatus the guide $F_9$ may, cam-like, be arranged to tilt reflector $F_6$ and thereby vary the angle at which light rays are directed upon the image, said reflector having an arm or follower 35 engaging a peripheral groove 36 in guide $F_9$.

An important adaptation of my apparatus consists in the employment of a unit such as is shown in FIG. 15 which is housed in the bottom of a larger display cabinet adaptable for store windows and other advantageous advertising positions for presenting pictures and advertisements of normal or enlarged size, as illustrated in FIGS. 18 and 19.

In FIG. 18 I have shown an enlarged cabinet R with a view aperture 37 below which a unit of the character of that shown in FIG. 15 may be mounted with its aperture 2 at the top of cabinet M and to one side of the center instead of at a side, so as to direct rays of light upwardly at an angle onto a parabolic reflector S which then serves to reflect the image horizontally to be observed by an eye E. A baffle 38 is provided between aperture 37 and unit M for preventing external light from interfering with the clarity of the reflected image.

FIG. 19 illustrates diagrammatically the employment of lenses T and $T_1$ between the image and the reflector S for the purpose of enlarging or regulating the size of the image transmitted to reflector S.

It will be noted that in all of the forms of apparatus shown and described I adhere to the principle of transmitting light through an image and also through a locally bulbous portion or portions of a sheet of translucent material. The bulbous portions are lens-like in that rays of light from a movable source are directed against portions of the image in such a manner that movement of the adjacent parts of the image is simulated. Such effects are obtained by several practices.

First, by forming a translucent screen so as to provide deformations of portions thereof from a plane of the screen which are of regular or irregular shape and of bulbous character and preferably of arcuate cross section so that when a light is moved on the reverse side of an image and the screen is held in a plane contiguous to the obverse side of the image the variable angle of light rays transmitted through the image and screen will afford an illusion of movement with respect to portions of the image.

Second, by providing an image having portions thereof bent from the plane of the body of the image, in combination with a tranaslucent screen having bulbous protrusions, so that movement of a light relative to the image will simulate movements of certain parts.

Third, the employment of either of the aforesaid methods, or both, in an intermittently operable machine for displaying successive animated pictures.

Fourth, the employment of any of the aforesaid methods in connection with a reflector from which the images may be displayed to observers.

Fifth, the employment of lenses between the images and viewers for magnifying the images to a desired extent.

I claim:

1. An apparatus for producing animated optical effects comprising: a cabinet having an aperture through which the products of animation may be viewed, a rotatable drum mounted therein and adapted to support a plurality of pictures successively for presentation through said aperture, a source of light within said drum arranged to project light through said pictures, a prime mover, actuating means operable by said prime mover for intermittently rotating the drum to present for a predetermined period successive pictures for observation through said aperture, additional actuating means operable by said prime mover for varying the position of the light source during the periods when the pictures are observable through the aperture, and translucent screens overlying and adjacent each picture and immovable with respect thereto and having non-magnifying bulbous protrusions from the plane of the picture and overlying selected portions of the picture, whereby as the position of the light source is changed a simulation of movement of the selected portions of the picture will be created.

2. Apparatus as defined in claim 1 further characterized by said additional actuating means causing the light source to travel in a plane parallel to the plane of the picture observable through the aperture.

3. Apparatus as defined in claim 1 further characterized by said drum being provided with means for supporting each of the pictures in a flat plane, and said actuating means successively moving said pictures in a position parallel to the aperture.

4. In a device for producing animated optical effects; a cabinet having an aperture through which the products of animation may be viewed, a rotatable drum mounted therein and adapted to support a plurality of pictures successively for presentation through said aperture, a source of light within said drum arranged to project through said pictures when viewed through said aperture, a prime mover, actuating means operable by said prime mover for intermittently rotating the drum to present for a predetermined period successive pictures for observation through said aperture, and additional actuating means operable by said prime mover for varying the position of the light source during the periods when the successive pictures are viewable through said aperture.

References Cited in the file of this patent

UNITED STATES PATENTS

| | | |
|---|---|---|
| 1,230,348 | Wadman | June 19, 1917 |
| 1,698,216 | Craig | Jan. 8, 1929 |
| 2,189,568 | Miller | Feb. 6, 1940 |
| 2,204,435 | Musaphia | June 11, 1940 |
| 2,393,970 | Burchell et al. | Feb. 5, 1946 |
| 2,663,960 | Cerraccheo | Dec. 29, 1953 |
| 2,699,706 | Boone | Jan. 18, 1955 |
| 2,832,593 | Anderson | Apr. 29, 1958 |

FOREIGN PATENTS

| | | |
|---|---|---|
| 1,091,318 | France | Apr. 12, 1955 |